United States Patent
Jeoung

(10) Patent No.: US 7,430,034 B2
(45) Date of Patent: Sep. 30, 2008

(54) ARRAY SUBSTRATE FOR IN-PLANE SWITCHING LIQUID CRYSTAL DISPLAY DEVICE WITH POLYCRYSTALLINE SILICON PIXEL ELECTRODE AND METHOD OF MANUFACTURING THE SAME

(75) Inventor: Hun Jeoung, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 112 days.

(21) Appl. No.: 11/527,552

(22) Filed: Sep. 27, 2006

(65) Prior Publication Data
US 2007/0013820 A1 Jan. 18, 2007

Related U.S. Application Data

(62) Division of application No. 10/804,020, filed on Mar. 19, 2004, now Pat. No. 7,130,010.

(30) Foreign Application Priority Data
Mar. 20, 2003 (KR) ............... 2003-0017476

(51) Int. Cl.
*G02F 1/1343* (2006.01)
(52) U.S. Cl. ............... 349/141; 349/38; 349/43; 349/140
(58) Field of Classification Search ............ 349/140, 349/141
See application file for complete search history.

(56) References Cited

U.S. PATENT DOCUMENTS

| 5,245,452 | A | 9/1993 | Nakamura et al. |
| 5,598,285 | A | 1/1997 | Kondo et al. |
| 5,838,037 | A | 11/1998 | Masutani et al. |
| 5,946,080 | A | 8/1999 | Ogiwara |
| 5,990,987 | A | 11/1999 | Tanaka |
| 6,028,653 | A | 2/2000 | Nishida |
| 6,097,454 | A | 8/2000 | Zhang et al. |
| 6,266,166 | B1 | 7/2001 | Katsumata et al. |
| 6,288,763 | B1 | 9/2001 | Hirota |
| 6,297,866 | B1 | 10/2001 | Seo et al. |
| 6,310,670 | B1 | 10/2001 | Lee |

(Continued)

FOREIGN PATENT DOCUMENTS

JP 2001-154636 6/2001

*Primary Examiner*—Richard H Kim
(74) *Attorney, Agent, or Firm*—McKenna Long & Aldridge LLP

(57) ABSTRACT

An array substrate for in-plane switching liquid crystal display device includes a gate line on a substrate, a data line crossing the gate line to define a pixel region, a semiconductor layer including an active area and a source area, wherein the active area overlaps the gate line and the source area overlaps the data line, a drain electrode connected to the semiconductor layer, a first capacitor electrode in the pixel region and connected to the drain electrode, a pixel electrode connected to the first capacitor electrode and substantially in parallel to the data line, a common line substantially parallel to the gate line, a second capacitor electrode connected to the common line and overlapping the first capacitor electrode, and a common electrode connected to the common line and alternatively arranged with the pixel electrode, wherein the source area of the semiconductive layer, the drain electrode, the first capacitor electrode and the pixel electrode include doped polycrystalline silicon.

7 Claims, 14 Drawing Sheets

U.S. PATENT DOCUMENTS 6,480,244 B2    11/2002   Murade et al.
6,665,024 B2 *  12/2003   Kurashina .................... 349/39

2002/0154252  A1    10/2002   Toyota et al.

* cited by examiner

ARRAY SUBSTRATE FOR IN-PLANE SWITCHING LIQUID CRYSTAL DISPLAY DEVICE WITH POLYCRYSTALLINE SILICON PIXEL ELECTRODE AND METHOD OF MANUFACTURING THE SAME

This application is a divisional of U.S. application Ser. No. 10/804,020, filed on Mar. 19, 2004 now U.S. Pat. No. 7,130,010, which claims the benefit of Korean Patent Application No. 2003-0017476, filed on Mar. 20, 2003, which are hereby incorporated by reference for all purposes as if fully set forth herein.

BACKGROUND OF THE INVENTION

1. Field of the Invention

The present invention relates to a liquid crystal display device, and more particularly, to an array substrate for an in-plane switching (IPS) liquid crystal display device and a method of fabricating the same.

2. Discussion of the Related Art

A liquid crystal display device uses the optical anisotropy and polarization properties of liquid crystal molecules to produce an image. Liquid crystal molecules have a definite orientational alignment as a result of their long, thin shapes. That alignment direction can be controlled by an applied electric field. In other words, as an applied electric field changes, so does the alignment of the liquid crystal molecules. Due to the optical anisotropy, the refraction of incident light depends on the alignment direction of the liquid crystal molecules. Thus, by properly controlling an applied electric field, a desired light image can be produced.

Of the different types of known liquid crystal displays (LCDs), active matrix LCDs (AM-LCDs), which have thin film transistors (TFTs) and pixel electrodes arranged in a matrix form, are the subject of significant research and development because of their high resolution and superiority in displaying moving images.

LCD devices have wide application in office automation (OA) equipment and video units because they are light and thin and have low power consumption characteristics. The typical liquid crystal display panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

In a conventional LCD device, since the pixel and common electrodes are positioned on the lower and upper substrates, respectively, the electric field induced between them is perpendicular to the lower and upper substrates. However, the conventional LCD devices having the longitudinal electric field have a drawback in that they have a very narrow viewing angle. In order to solve the problem of narrow viewing angle, in-plane switching liquid crystal display (IPS-LCD) devices have been proposed. IPS-LCD devices include a lower substrate where a pixel electrode and a common electrode are disposed, an upper substrate having no electrode, and a liquid crystal interposed between the upper and lower substrates. A detailed explanation of the operation modes of a related art IPS-LCD panel will be provided referring to FIG. 1.

FIG. 1 is a schematic cross-sectional view illustrating a concept of a related art IPS-LCD panel. As shown in FIG. 1, first and second substrates 10 and 20 are spaced apart from each other, and a liquid crystal layer 30 is interposed therebetween. The first and second substrates 10 and 20 are often referred to as an array substrate and a color filter substrate, respectively. On the first substrate 10 are a first electrode 12 and a second electrode 14. The first and second electrodes 12 and 14 are aligned parallel to each other. The first electrode 12 may function as a common electrode and the second electrode 14 may serve as a pixel electrode. On a surface of the second substrate 20, a color filter layer (not shown) is commonly positioned between the second electrode 14 and the first electrode 12 of the first substrate 10. A voltage applied across the first and second electrodes 12 and 14 produces an electric field 16 through liquid crystal molecules 32 of the liquid crystal layer 30. The liquid crystal layer 30 has a positive dielectric anisotropy, and thus the liquid crystal molecules 32 align parallel to the electric field 16.

When no electric field is produced by the first and second electrodes 12 and 14, i.e., off state, the longitudinal axes of the liquid crystal (LC) molecules 32 are parallel and form a definite angle with the first and second electrodes 12 and 14. For example, the longitudinal axes of the LC molecules 32 are arranged parallel with both the first and second electrodes 12 and 14.

On the contrary, when a voltage is applied to the first and second electrodes 12 and 14, i.e., on state, an in-plane electric field 16 that is parallel to the surface of the first substrate 10 is produced because the first and second electrodes 12 and 14 are on the first substrate 10. Accordingly, the LC molecules 32 are re-arranged to bring their longitudinal axes into coincidence with the electric field 16.

Therefore, the result is a wide viewing angle that ranges from about 80 to 85 degrees in up-and-down and left-and-right sides from a line vertical to the IPS-LCD panel, for example.

FIG. 2 is a plan view illustrating one pixel of an array substrate for an IPS-LCD device according to the related art. As shown in FIG. 2, a gate line 52 is formed in a first direction and a data line 54 is formed in a second direction crossing the gate line. The gate and data lines 52 and 54 define a pixel region P on the array substrate. A thin film transistor T is formed at a crossing of the gate and data lines 52 and 54. In the pixel region P, a first connecting line 56 connected to the thin film transistor T is formed in the first direction, and a plurality of pixel electrodes 58 extends from the first connecting line 56 along the second direction. The plurality of pixel electrodes 58 are spaced apart from each other, and one end of the plurality of pixel electrodes 58 is connected to a second connecting line 60. A common line 62 is formed parallel to the gate line 52. The common line 62 crosses centers of the plurality of pixel electrodes 58. A plurality of common electrodes 64 extends from the common line 62 upward and downward in the context of the figure. The plurality of common electrodes 64 is alternatively arranged with the plurality of pixel electrodes 58.

To remove a noise field between the data line 54 and the pixel electrodes 58, which causes poor images, the common electrode 64 lies close by the data line 54.

For example, the common line 62 and the common electrode 64 are formed of the same material through the same process as the gate line 52. The first and second connecting lines 56 and 60 and the pixel electrodes 58 are formed of the same material through the same process as the data line 54. The thin film transistor T includes a gate electrode 66 that extends from the gate line 52, a source electrode 68 that extends from the data line 54, a drain electrode 70 that is spaced apart from the source electrode 68, and a semiconductor layer 72 that covers the gate electrode 66 and overlaps the source electrode 68 and the drain electrode 70 in part. An intrinsic material of the semiconductor layer 72 is selected from amorphous silicon. The thin film transistor T may be an inverted staggered type. The drain electrode 70 may be formed integral with the first connecting line 56.

In the IPS-LCD device, a region in which liquid crystal molecules are driven corresponds to an area in which the liquid crystal molecules are horizontally arranged by a lateral electric field. That is, the region includes spaces between the common electrode 64 and the pixel electrode 58 and sides of the common electrode 64 and the pixel electrode 58. However, in the above structure, since the common and pixel electrodes are made of an opaque metal material, images are displayed only in the spaces between the common and pixel electrodes 64 and 58 to lower an aperture ratio.

To improve the aperture ratio, one of the common and pixel electrodes may be formed of a transparent conducting material.

FIG. 3 is a plan view illustrating one pixel of an array substrate for an IPS-LCD device having an improved aperture ratio according to the related art. The array substrate of FIG. 3 may have the same structure as that of FIG. 2, and some of the detailed explanations, previously explained with reference to FIG. 2 will be omitted in order to prevent duplicate explanations.

As shown in FIG. 3, a thin film transistor T, which includes a gate electrode 82, a semiconductor layer 84, a source electrode 86 and a drain electrode 88, is formed at a crossing of a gate line 72 and a data line 74. The drain electrode 88 is connected to a first connecting line 92 through a drain contact hole 90. A plurality of pixel electrodes 94 extends from the first connecting line 92, and one end of the pixel electrodes 94 is connected to a second connecting line 96. The first and second connecting lines 92 and 96 and the pixel electrodes 94 may be made of a transparent conducting material, beneficially indium-tin-oxide (ITO).

A common line 98 and a plurality of common electrodes 99 may have the same structures and may be made of the same material as those of FIG. 2.

Selection of the transparent conducting material as an electrode material for improving the aperture ratio may have the following problems.

First, the transparent conducting material may be patterned by a wet etching method like the opaque metal material. A critical dimension (CD), which may be defined as a design rule of a pattern in the panel, may be non-uniform in each region due to the wet etching process. In addition, since the transparent conducting material transmits light, scratches on a back surface of the substrate by a chuck for supporting the substrate may have large effects on an exposing process of the substrate, whereby patterns having uneven sides may be formed. Therefore, spots in the images may occur, and image qualities may be lowered.

Second, because the drain contact hole may be necessary to connect the electrode of the transparent conducting material with the metal line, the number of manufacturing processes may be increased. If the common and pixel electrodes are formed of the transparent conducting material, more processes for forming contact holes may be needed, and thus problems may be increased.

SUMMARY OF THE INVENTION

Accordingly, the present invention is directed to an array substrate for an in-plane switching liquid crystal display device and a method of fabricating the same that substantially obviates one or more of the problems due to limitations and disadvantages of the related art.

An advantage of the present invention is to provide an array substrate for an in-plane switching liquid crystal display device and a method of fabricating the same, which increase an aperture ratio.

Another advantage of the present invention is to provide an array substrate for an in-plane switching liquid crystal display device and a method of fabricating the same, which has a uniform critical dimension.

Another advantage of the present invention is to provide an array substrate for an in-plane switching liquid crystal display device and a method of fabricating the same, which reduces manufacturing processes.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages, and in accordance with the purpose of the present invention, as embodied and broadly described, an embodiment provides an array substrate for an in-plane switching liquid crystal display device including a gate line on a substrate, a data line crossing the gate line to define a pixel region, a semiconductor layer including an active area and a source area, wherein the active area overlaps the gate line and the source area overlaps the data line, a drain electrode connected to the semiconductor layer, a first capacitor electrode in the pixel region and connected to the drain electrode, a pixel electrode connected to the first capacitor electrode and substantially in parallel to the data line, a common line substantially parallel to the gate line, a second capacitor electrode connected to the common line and overlapping the first capacitor electrode, and a common electrode connected to the common line and alternatively arranged with the pixel electrode, wherein the source area of the semiconductor layer, the drain electrode, the first capacitor electrode and the pixel electrode include doped polycrystalline silicon.

In another aspect, an array substrate for an in-plane switching liquid crystal display device includes a gate line on a substrate, a data line crossing the gate line to define a pixel region, a semiconductor layer including an active area and a source area, wherein the active area overlaps the gate line and the source area overlaps the data line, a drain electrode connected to the semiconductor layer, a first capacitor electrode in the pixel region and connected to the drain electrode, a pixel electrode connected to the first capacitor electrode and parallel to the data line, a first common line parallel to the gate line, a second capacitor electrode connected to the first common line and overlapping the first capacitor electrode, an auxiliary capacitor electrode covering and connected to the second capacitor electrode, a second common line covering and connected to the auxiliary capacitor electrode, and a common electrode connected to the second common line and alternatively arranged with the pixel electrode, wherein the source area of the semiconductor layer, the drain electrode, the first capacitor electrode and the pixel electrode includes doped polycrystalline silicon.

In another aspect of the present invention, a method of fabricating an array substrate for an in-plane switching liquid crystal display device includes forming a semiconductor layer, a drain electrode, a first capacitor electrode and a pixel electrode on a substrate using polycrystalline silicon, the semiconductor layer including an active area and a source area, forming a gate insulating layer, a gate line, a second capacitor electrode, a common line and a common electrode, wherein forming a gate insulating layer, a gate line, a second capacitor electrode, a common line and a common electrode include forming a first insulating layer and a first metal layer on the substrate including the semiconductor layer, the drain electrode, the first capacitor electrode and the pixel electrode; patterning the first insulating layer and the first metal layer, wherein the gate line overlaps the active area of the semiconductor layer, the second capacitor electrode covers the first capacitor electrode, and the common electrode extends from the common line, forming an inter insulating layer to cover the gate line, the second capacitor electrode, the common line, and the common electrode by forming a second insulating layer and patterning the second insulating layer, the inter insulating layer having a source contact hole to expose the source area, and forming a data line on the inter insulating layer, wherein forming a data line includes forming and patterning a second metal layer, the data line being connected to the source area through the source contact hole.

In another aspect, an array substrate for an in-plane switching liquid crystal display device includes a gate line on a substrate in a first direction, a gate electrode, a data line in a second direction including a source electrode and crossing the gate line to define a pixel region, a first capacitor electrode in the pixel region, a common line of the second direction, a common electrode extending from the common line, a drain electrode spaced apart from the source electrode, a second capacitor electrode overlapping the first capacitor electrode, a pixel electrode alternatively arranged with the common electrode, and a semiconductor layer covering the gate electrode and overlapping the source electrode, the semiconductor layer including an active layer and an ohmic contact layer, wherein the ohmic contact layer, the drain electrode, the second capacitor electrode and the pixel electrode include doped amorphous silicon permitting light-transmission.

In another aspect, an array substrate for an in-plane switching liquid crystal display device includes a gate line of a first direction, a data line of a second direction, wherein the data line crosses the gate line to define a pixel region, a thin film transistor arranged at a crossing of the gate and data lines, a pixel electrode of the second direction connected to the thin film transistor, the pixel electrode including doped semiconductor material permitting light-transmission, and a common electrode of the second direction alternatively arranged with the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the present invention and together with the description serve to explain the principles of that invention.

In the drawings.

DETAILED DESCRIPTION OF THE ILLUSTRATED EMBODIMENTS

Reference will now be made in detail to an illustrated embodiment of the present invention, examples of which are shown in the accompanying drawings.

Figure 1:
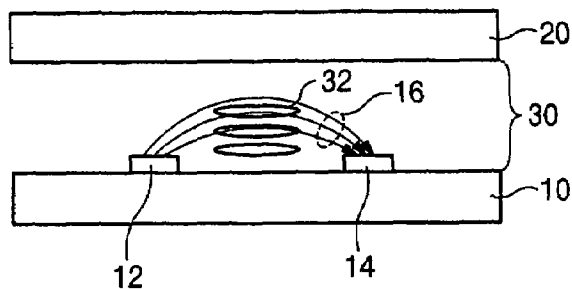
FIG. 1 is a schematic cross-sectional view illustrating a related art IPS-LCD panel.
Figure 2:
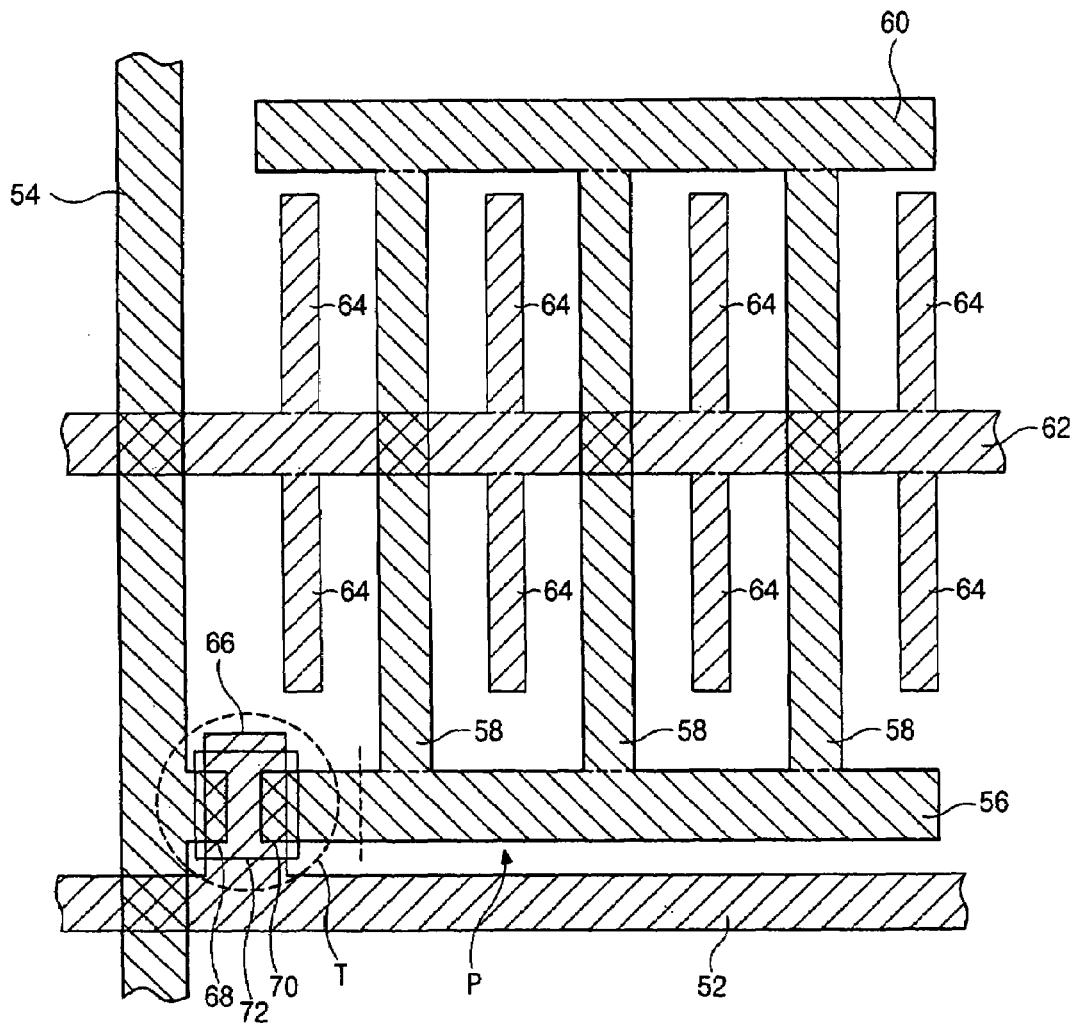
FIG. 2 is a plan view illustrating one pixel of an array substrate for an IPS-LCD device according to the related art.
Figure 3:
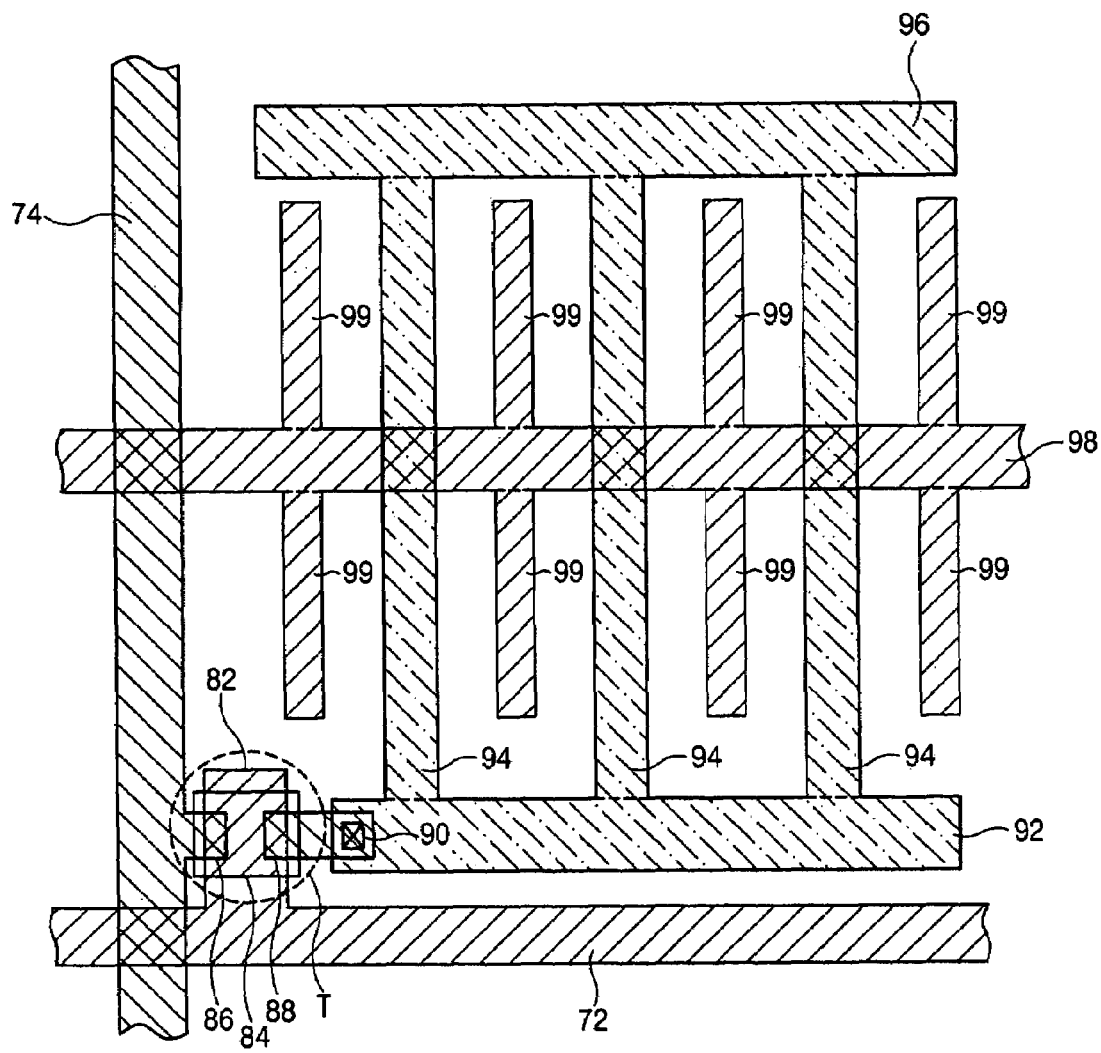
FIG. 3 is a plan view illustrating one pixel of an array substrate for an IPS-LCD device having an improved aperture ratio according to the related art.
Figure 4:
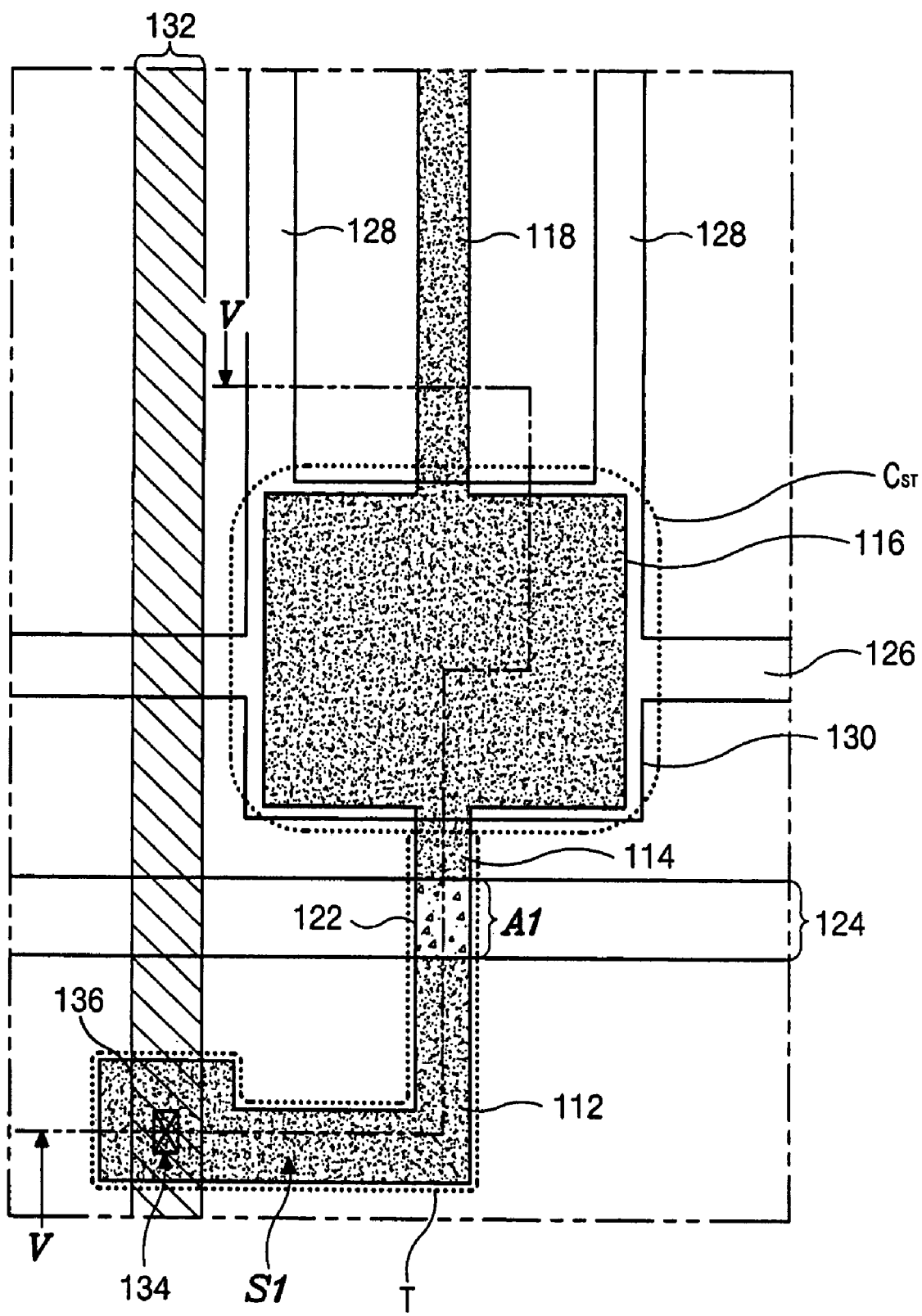
FIG. 4 is a plan view illustrating an array substrate for an IPS-LCD device according to a first embodiment of the present invention.

FIG. 4 is a plan view illustrating an array substrate for an IPS-LCD device according to a first embodiment of the present invention. The array substrate includes a top gate type thin film transistor.

As shown in FIG. 4, a gate line 124 is formed in a first direction and a data line 132 is formed in a second direction crossing the first direction. The gate line 124 and the data line 132 cross each other to define a pixel region P.

A semiconductor layer 112 is formed to overlap the gate line 124 and the data line 132. A first capacitor electrode 116 and a pixel electrode 118 are formed in the pixel region P. The pixel electrode 118 connected to the first capacitor electrode 116 is formed parallel to the data line 132. A drain electrode 114 is interposed between the semiconductor layer 112 and the first capacitor electrode 116. The semiconductor layer 112 includes an active area A1 and a source area S1. The active area A1 overlaps the gate line 124, and an overlapped portion of the gate line 124 may be referred to as a gate electrode 122. The source area S1 overlaps the data line 132, and an overlapped portion of the data line 132 may be referred to as a source electrode 136. The source area S1 is connected to the source electrode 136 through a source contact hole 134. The drain electrode 114 is connected to the active area A1 and the first capacitor electrode 116. The semiconductor layer 112, the gate electrode 122, the source electrode 136 and the drain electrode 114 may form a thin film transistor T.

The semiconductor layer 112, the drain electrode 114, the first capacitor electrode 116 and the pixel electrode 118 may be formed as one united body or integrated. The semiconductor layer 112, the drain electrode 114, the first capacitor electrode 116 and the pixel electrode 118 may be formed to include polycrystalline silicon. The active area S1 of the semiconductor layer 112 may be intrinsic, and the source area S1, the drain electrode 114, the first capacitor electrode 116, and the pixel electrode 118 may be doped with impurities.

A common line 126 may be formed substantially in parallel to the gate line 124, and a plurality of common electrodes 128 extends from the common line 126. The plurality of common electrodes 128 may be substantially parallel to the data line 132 and may be alternatively arranged with the pixel electrode 118. A second capacitor electrode 130 is formed to overlap the first capacitor electrode 116. The common line 126 and the common electrodes 128 are connected to the second capacitor electrode 130. The first and second capacitor electrodes 116 and the 130 may form a storage capacitor $C_{ST}$ having an insulating layer (not shown) interposed therebetween.

The semiconductor layer 112, the drain electrode 114, the first capacitor electrode 116 and the pixel electrode 118 of polycrystalline silicon may be patterned using a dry etching method known to those of skill in the art, and thus critical dimension (CD) loss problems caused by a wet etching method may be solved.

In addition, the aperture ratio may be increased because the semiconductor material, such as the polycrystalline silicon, permits light-transmission.

Furthermore, because the semiconductor layer 112, the first capacitor electrode 116 and the pixel electrode 118 may be formed as one united body or may be integrated, a process for forming a contact hole may be omitted, thereby reducing problems in manufacturing processes.

Figure 5:
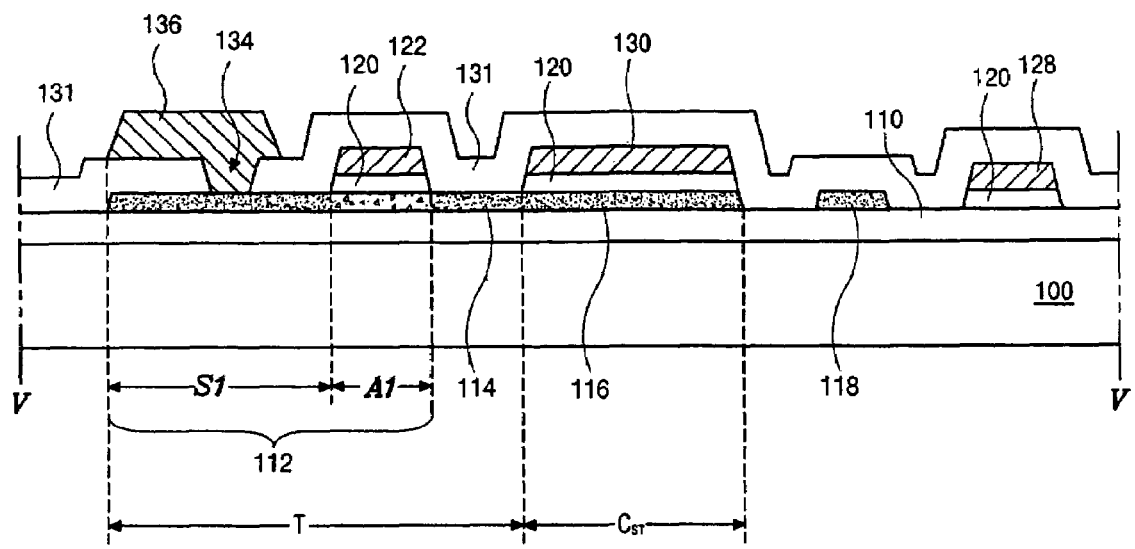
FIG. 5 is a cross-sectional view taken along the line V-V of FIG. 4.

FIG. 5 is a cross-sectional view illustrating the array substrate for the IPS-LCD device according to the first embodiment of the present invention, and corresponds to a cross-section taken along the line V-V of FIG. 4.

In FIG. 5, a buffer layer 110 is formed on a substrate 100, and a semiconductor layer 112, a drain electrode 114, a first capacitor electrode 116 and a pixel electrode 118 are formed on the buffer layer 110. As shown in FIG. 4, the semiconductor layer 112, the drain electrode 114, the first capacitor electrode 116 and the pixel electrode 118 may be formed as one united body or integrated during the same process and may be formed to include polycrystalline silicon. The drain electrode 114, the first capacitor electrode 116, and the pixel electrode 118 may include doped polycrystalline silicon, and the semiconductor layer 112 may include an active area A1 of pure polycrystalline silicon and the source area S1 of doped polycrystalline silicon.

A gate insulating layer 120 is formed on the substrate 100 including the semiconductor layer 112, the drain electrode 114, the first capacitor electrode 116 and the pixel electrode 118. The gate insulating layer 120 is disposed over the active area A1 of the semiconductor layer 112, the first capacitor electrode 116 and the buffer layer 110. A gate electrode 122 is formed on the gate insulating layer 120 over the active area A1, and a second capacitor electrode 130 is formed on the gate insulating layer 120 over the first capacitor electrode 116. A common electrode 128 is formed on the gate insulating layer 120 over the buffer layer 110, wherein the gate insulating layer 120 is spaced apart from the pixel electrode 118.

An inter insulating layer 131 is formed to cover the source area S1, the gate electrode 122, the second capacitor electrode 130, the pixel electrode 118, and the common electrode 128. The inter insulating layer 131 has a source contact hole 134 exposing the source area S1. A source electrode 136 is formed on the inter insulating layer 131 and is connected to the source area S1 through the source contact hole 134.

The semiconductor layer 112, the drain electrode 114, the gate electrode 122, and the source electrode 136 form a thin film transistor T, and the first and second capacitor electrodes 116 and 130, respectively, form a storage capacitor $C_{ST}$ having the gate insulating layer 120 interposed therebetween.

In the first embodiment, only the active area A1 of the semiconductor layer 112 may be selectively masked and an n-type or p-type doping process may be performed over the exposed semiconductor layer 112 before forming the gate insulating layer 120. Therefore, although the gate electrode 122 and the second capacitor electrode 130 may be formed through the same process, semiconductor materials under the gate electrode 122 and the second capacitor electrode 130 may have different electrical characteristics.

Because a process for forming a contact hole between the drain electrode and the pixel electrode and a contact hole for the storage capacitor may be omitted, manufacturing productivity may be increased. Additionally, the storage capacitor may have a larger area, which prevents problems such as flicker and cross-talk.

The semiconductor material may permit light-transmission, which increases the aperture ratio. And, because the semiconductor material may be patterned using a dry etching method, the critical dimensions (CDs) may be uniformly controlled over the whole LCD panel. Thus poor images from CD loss may be decreased due to regular spacing between the electrodes.

FIGS. 6A-6D and FIGS. 7A-7D illustrate a manufacturing process of the array substrate for the IPS-LCD device according to the first embodiment of the present invention. FIGS. 6A-6D are plan views illustrating the manufacturing processes and FIGS. 7A-7D are cross-sectional views along the line VIIA-VIIA of FIG. 6A, the line VIIB-VIIB of FIG. 6B, the line VIIC-VIIC of FIG. 6C and the line VIID-VIID of FIG. 6D, respectively.

Figure 6A:
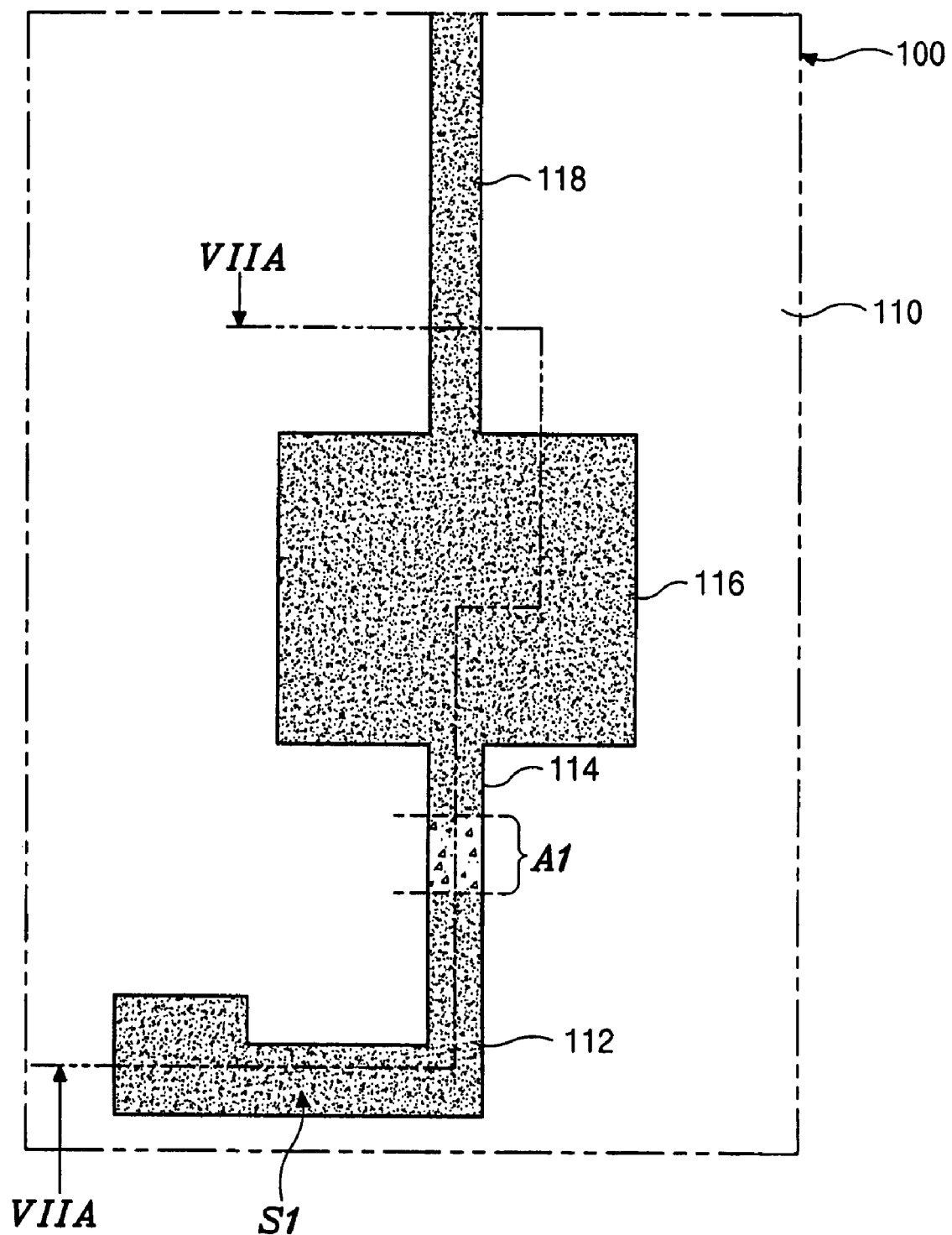
FIGS. 6A to 6D and FIGS. 7A to 7D are views illustrating manufacturing process of the array substrate for the IPS-LCD device according to the first embodiment of the present invention.
Figure 7A:
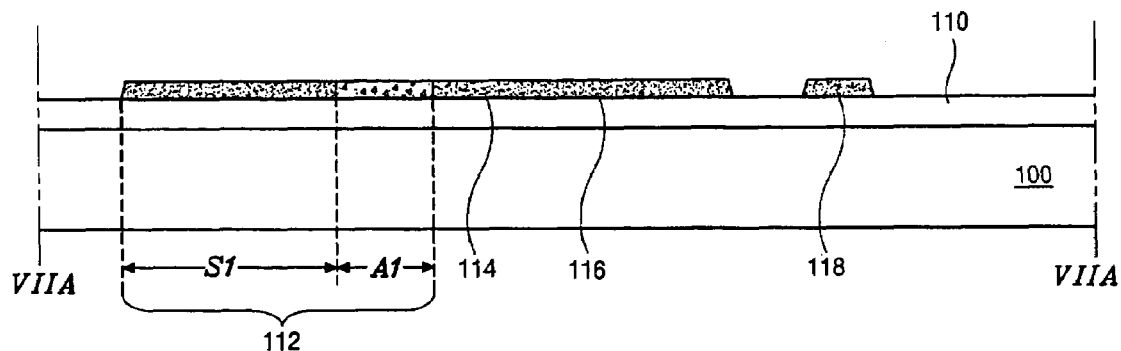

In FIGS. 6A and 7A, a buffer layer 110 is formed on a substrate 100, and a semiconductor layer 112, a drain electrode 114, a first capacitor electrode 116 and a pixel electrode 118 are formed on the buffer layer 110 by a first mask process using polycrystalline silicon. The semiconductor layer 112, the drain electrode 114, the first capacitor electrode 116 and the pixel electrode 118 may be formed as one united body. The buffer layer 110 may be omitted. The pixel electrode 118 extends from the first capacitor electrode 116 along a first direction.

The semiconductor layer 112 includes an active area A1 of pure polycrystalline silicon and a source area S1 of doped polycrystalline silicon. The drain electrode 114, the first capacitor electrode 116 and the pixel electrode 118 are formed of the same doped polycrystalline silicon as the source area S1, and may be conductive.

A doping process may be performed before forming a gate electrode because a pattern formed of the same material as the gate electrode is formed over the first capacitor electrode 116. In the alternative, the doping process may be carried out using the gate electrode as a doping mask.

The polycrystalline silicon may be formed by depositing amorphous silicon and crystallizing the amorphous silicon.

Figure 6B:
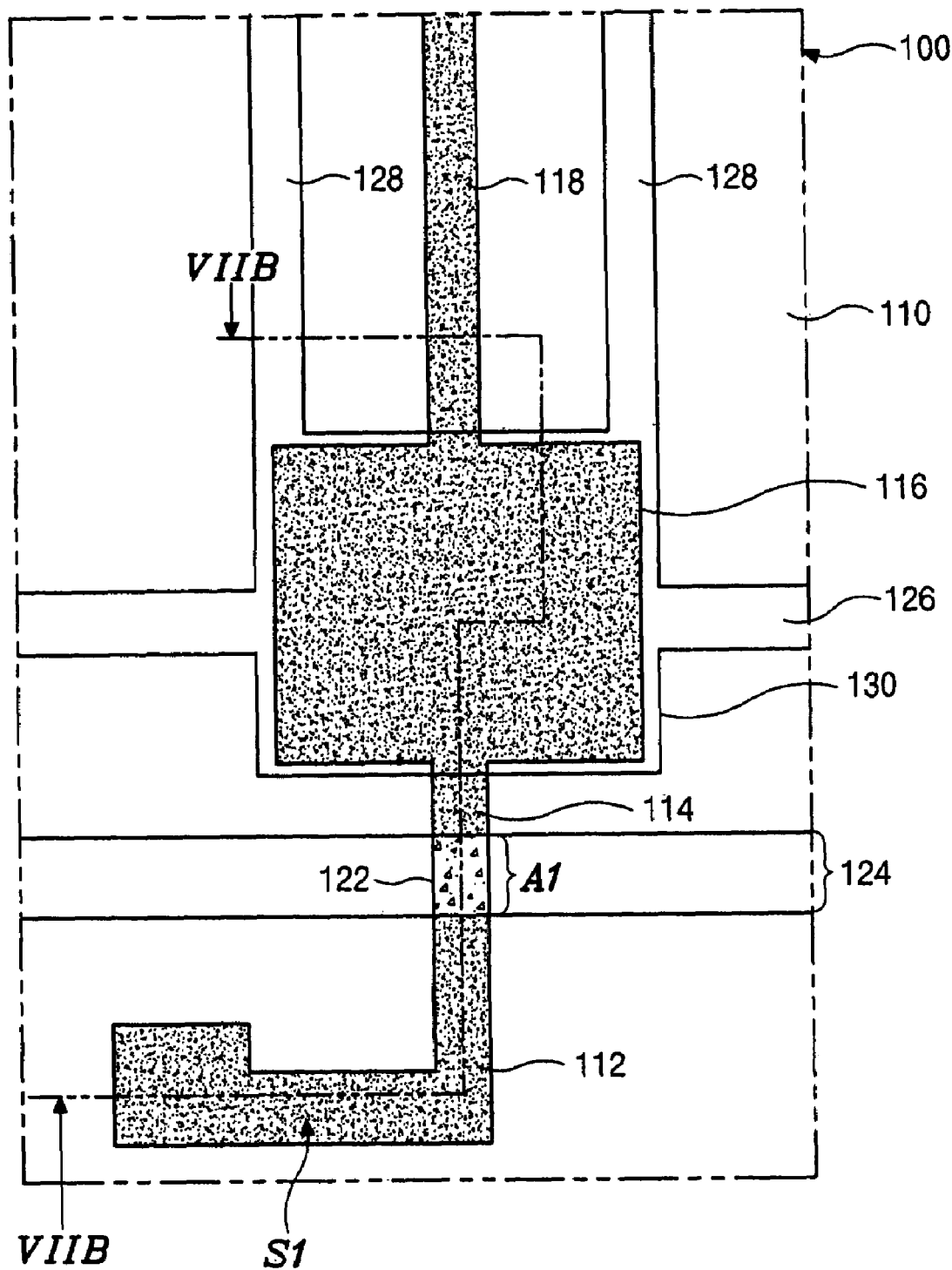
Figure 7B:
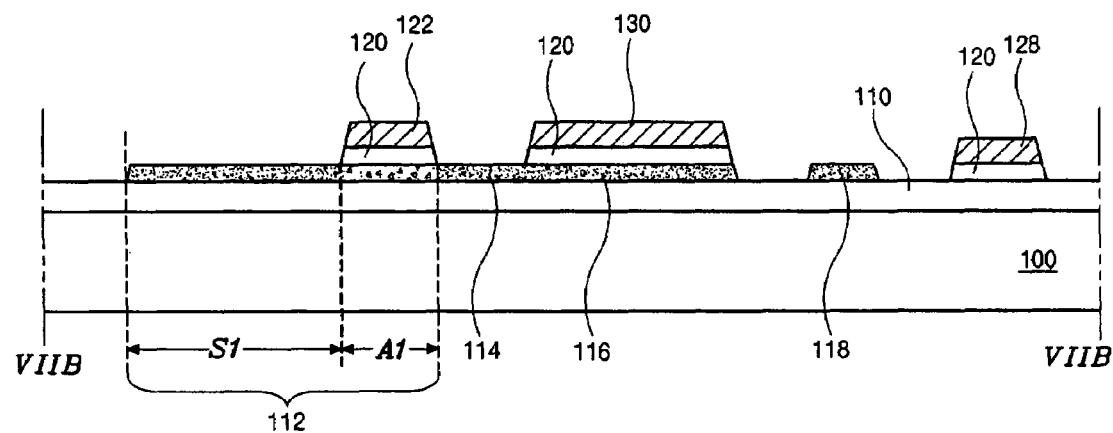

In FIGS. 6B and 7B, a first insulating layer and a first metal layer are sequentially formed to cover the semiconductor layer 112, the drain electrode 114, the first capacitor electrode 116 and the pixel electrode 118, and then are patterned through a second mask process to form a gate electrode 122, a second capacitor electrode 130 and a plurality of common electrodes 128, wherein the first insulating layer under the gate electrode 122, the second capacitor electrode 130 and the common electrode 128 is a gate insulating layer 120. The gate electrode 122 is disposed over the active area A1 of the semiconductor layer 112, and is a part of a gate line 124, which is extended in a second direction crossing the first direction. The second capacitor electrode 130 overlaps the first capacitor electrode 116, and is connected to a common line 126, which is formed in the second direction. The common electrodes 128 are alternatively arranged with the pixel electrode 118 and are connected to the second capacitor electrode 130.

The first insulating layer may be patterned using the gate line 124, the gate electrode 122, the common line 126, the second capacitor electrode 130 and the common electrodes 128 as an etching mask, whereby the gate insulating layer 120 may have the same shape as the gate line 124, the gate electrode 122, the common line 126, the second capacitor electrode 130 and the common electrodes 128.

Figure 6C:
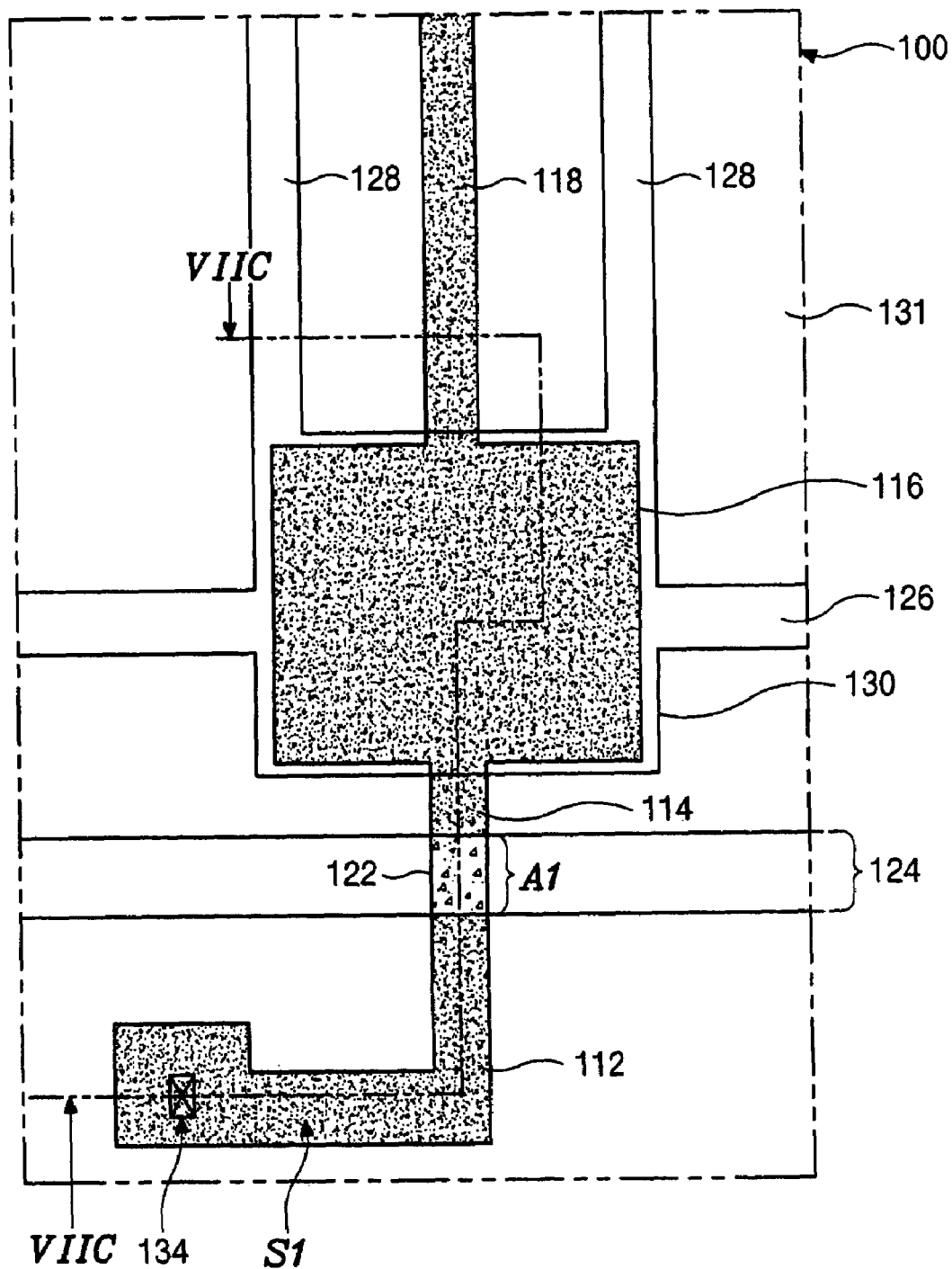
Figure 7C:
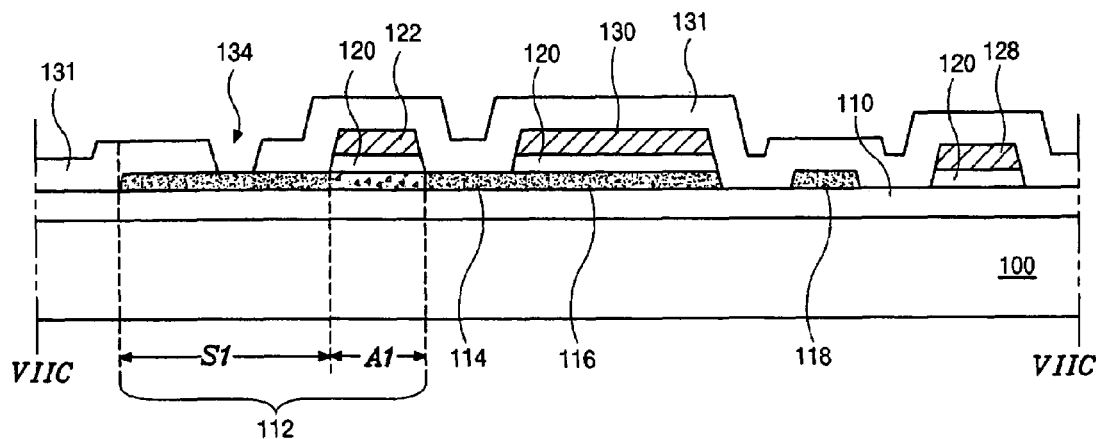

In FIGS. 6C and 7C, a second insulating layer is formed to cover the gate line 124, the gate electrode 122, the common line 126, the second capacitor electrode 130 and the common electrodes 128, and is patterned through a third mask process to form an inter insulating layer 131. The inter insulating layer 131 includes a source contact hole 134 exposing a portion of the source area S1.

Figure 6D:
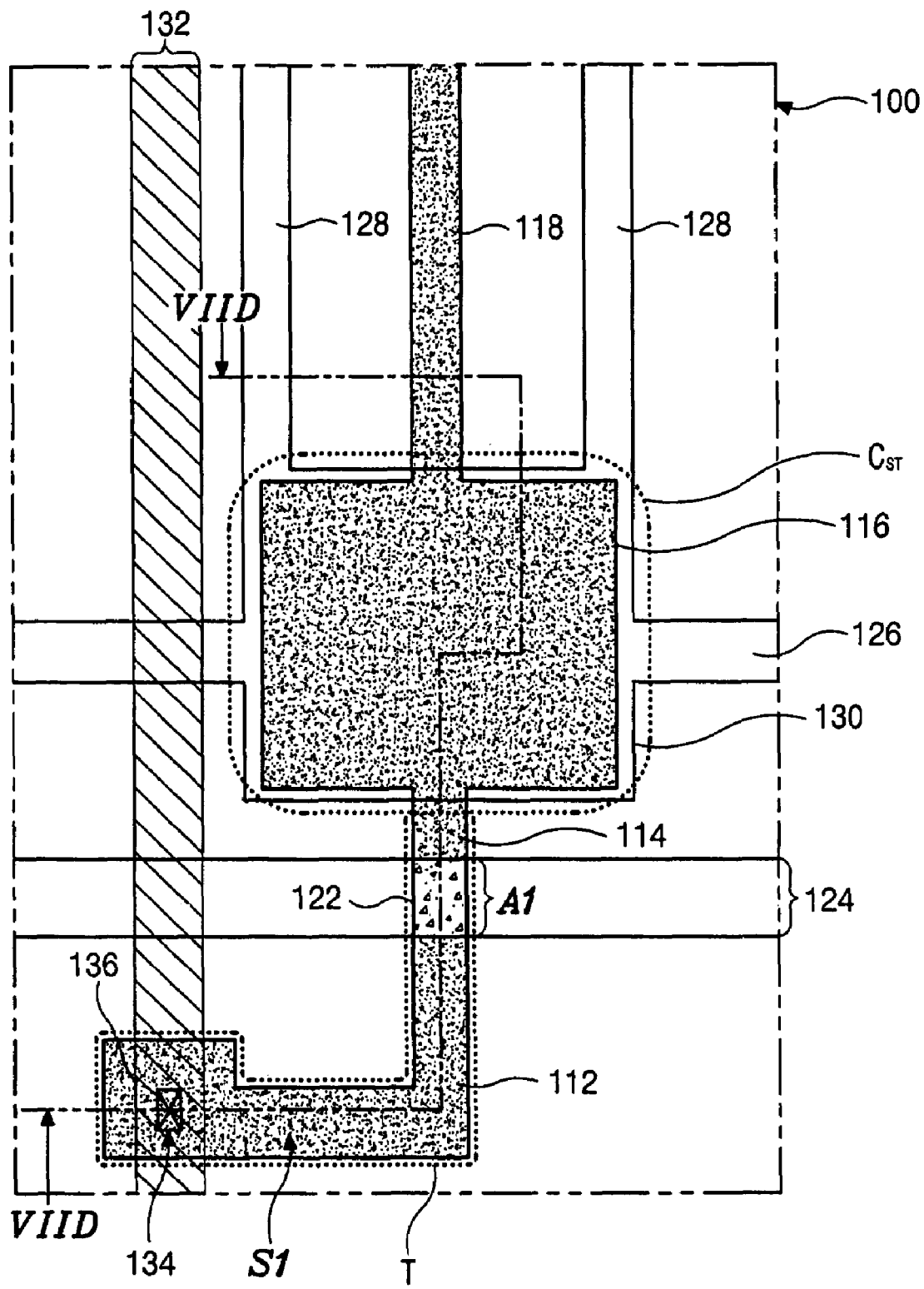
Figure 7D:
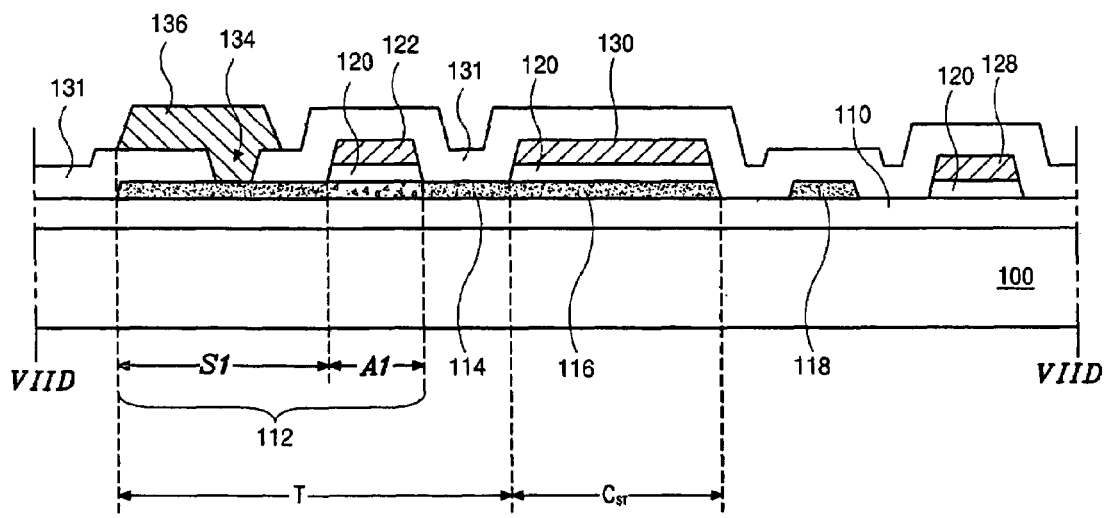

In FIGS. 6D and 7D, a second metal layer is formed on the inter insulating layer 131, and then is patterned through a fourth mask process to form a data line 132. The data line 132 is extended in the first direction, and has a source electrode 136, which is connected to the source area S1 through the source contact hole 134.

The semiconductor layer 112, the drain electrode 114, the gate electrode 122 and the source electrode 136 form a thin film transistor T, and the first and second capacitor electrodes 116 and 130, respectively, form a storage capacitor $C_{ST}$ having the gate insulating layer 120 interposed therebetween.

Figure 8:
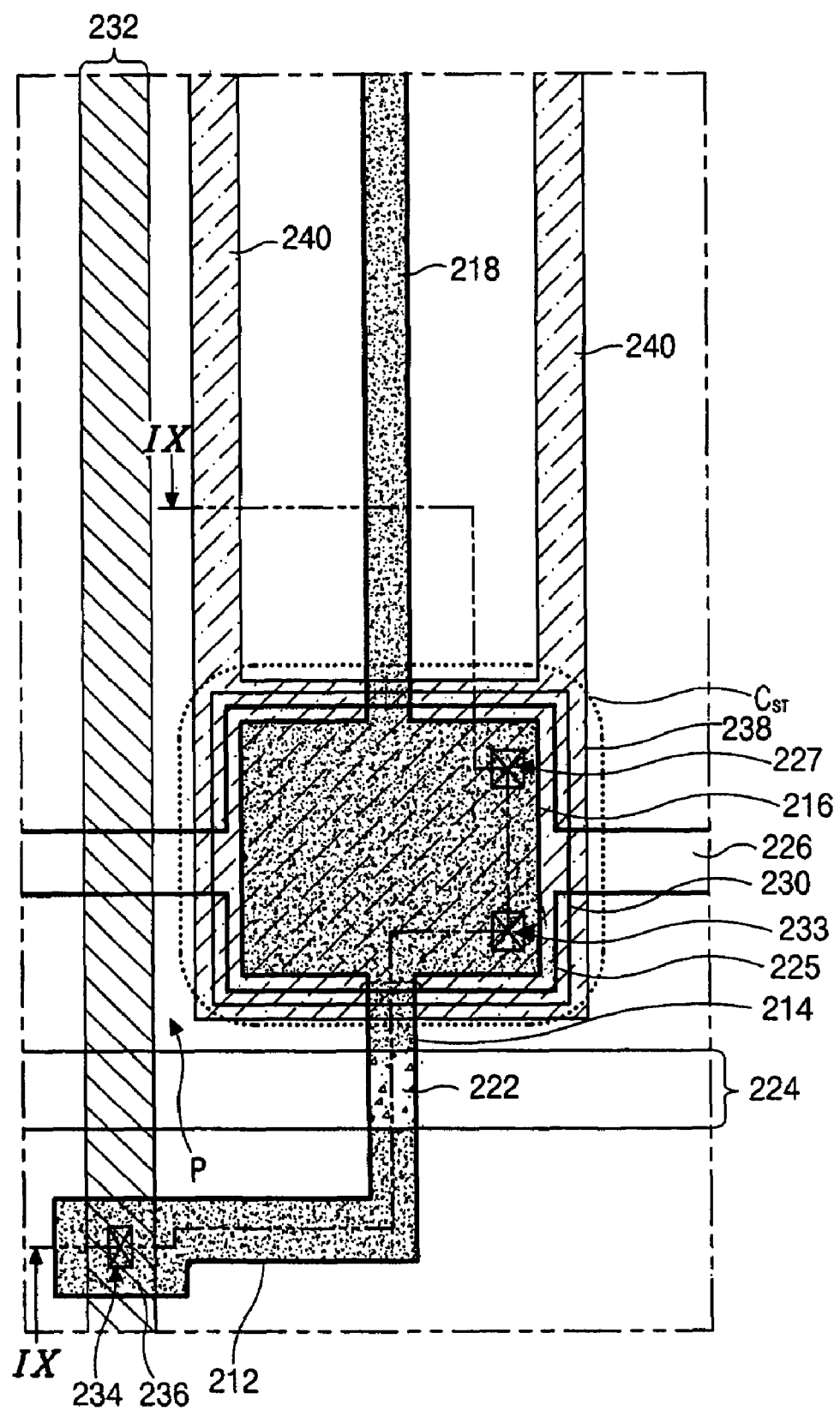
FIG. 8 is a plan view illustrating an array substrate for an IPS-LCD device according to a second embodiment of the present invention.

FIG. 8 is a plan view illustrating an array substrate for an IPS-LCD device according to a second embodiment of the present invention.

In FIG. 8, a gate line 224 including a gate electrode 222 and a data line 232 including a source electrode 236 are formed to cross each other. The gate and data lines 224 and 236, respectively, define a pixel region P. A semiconductor layer 212 is formed to overlap the gate electrode 222 and the source electrode 236. A first capacitor electrode 216 is formed in the pixel region P and a pixel electrode 218 is formed substantially parallel to the data line 232. A drain electrode 214 is formed between the semiconductor layer 212 and the first capacitor electrode 216. The semiconductor layer 212, the drain electrode 214, the first capacitor electrode 216 and the pixel electrode 218 are made of polycrystalline silicon and are formed as a unit during the same process. The source electrode 236 is connected to the semiconductor layer 212 through a source contact hole 234.

A first common line 226 is formed substantially in parallel to the gate line 224 and a second capacitor electrode 225 overlaps the first capacitor electrode 216 and is connected to the first common line 226. An auxiliary capacitor electrode 230 is formed to cover the second capacitor electrode 225. The auxiliary capacitor electrode 230 is connected to the second capacitor electrode 225 through a first contact hole 227. A second common line 238, connected to the auxiliary capacitor electrode 230 through a second contact hole 233, is formed to cover the auxiliary capacitor electrode 230. A plurality of common electrodes 240 extends from the second common line 238 substantially in parallel to data line 232. The plurality of common electrodes 240 is alternatively arranged with the pixel electrode 218.

The first capacitor electrode 216, and the second capacitor electrode 225, the auxiliary capacitor electrode 230 and the second common line 238 form a storage capacitor $C_{ST}$ having an insulating layer (not shown) interposed therebetween.

The first common line 226 may be formed of the same material and during the same process as the gate line 224, and the auxiliary capacitor electrode 230 may be formed of the same material and during the same process as the data line 232.

In the second embodiment, the common electrodes 240, as well as the pixel electrode 218, are formed of a transparent conductive material. Thus, the aperture ratio is improved and problems due to the CD loss are reduced as compared with the related art. Additionally, a process for forming a contact hole may be omitted to decrease the number of manufacturing processes and an area of the storage capacitor $C_{ST}$ may be increased to prevent image flicker and cross-talk.

Figure 9:
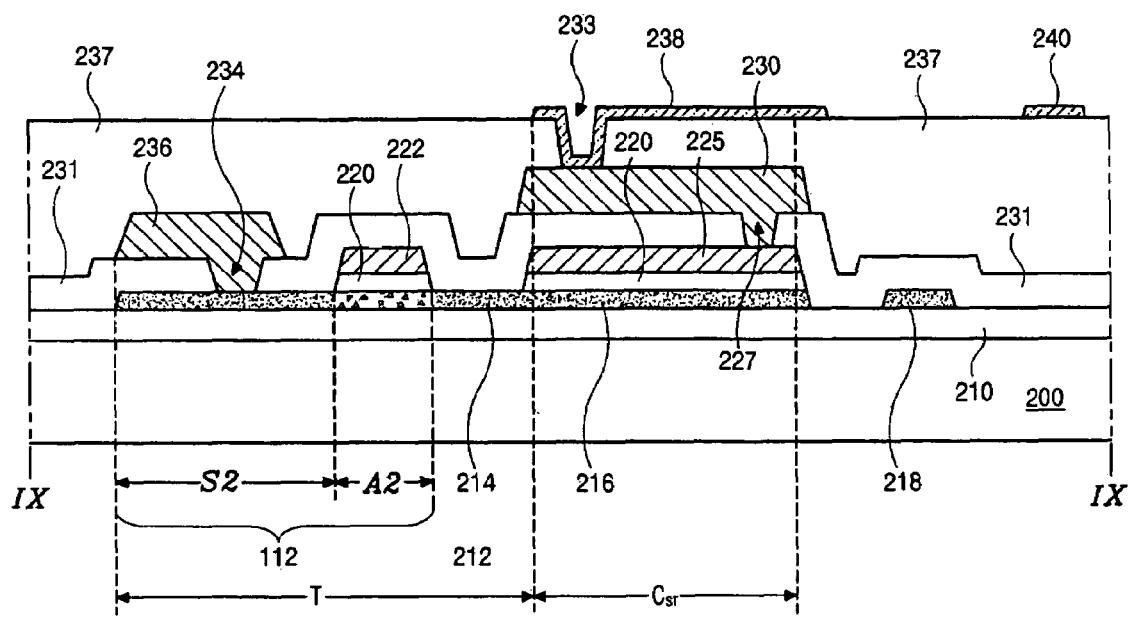
FIG. 9 is a cross-sectional view taken along the line IX-IX of FIG. 8.

FIG. 9 is a cross-sectional view illustrating the array substrate for the IPS-LCD device according to the second embodiment of the present invention, and corresponds to a cross-section taken along the line IX-IX of FIG. 8. In FIG. 9, a buffer layer 210 is formed on a substrate 200, and a semiconductor layer 212, a drain electrode 214, a first capacitor electrode 216 and a pixel electrode 218 are formed of polycrystalline silicon on the buffer layer 210 during the same process. As shown in FIG. 8, the semiconductor layer 212, the drain electrode 214, the first capacitor electrode 216 and the pixel electrode 218 may be formed as a single unit. The buffer layer 210 may be omitted.

The semiconductor layer 212 may include an active area A2 of pure polycrystalline silicon and a source area S2 of doped polycrystalline silicon. The drain electrode 214, the first capacitor electrode 216 and the pixel electrode 218 may include doped polycrystalline silicon.

A gate insulating layer 220 is formed on the substrate 200 including the semiconductor layer 212, the drain electrode 214, the first capacitor electrode 216 and the pixel electrode 218. The gate insulating layer 220 is disposed over the active area A2 of the semiconductor layer 212 and the first capacitor electrode 216. A gate electrode 222 is formed on the gate insulating layer 220 over the active area A2, and a second capacitor electrode 225 is formed on the gate insulating layer 220 over the first capacitor electrode 216.

An inter insulating layer 231 is formed to cover the source area S2, the gate electrode 222, the second capacitor electrode 225, and the pixel electrode 218. The inter insulating layer 231 has a source contact hole 234 exposing the source area S2 and a first contact hole 227 exposing the second capacitor electrode 225.

A source electrode 236 and an auxiliary capacitor electrode 230 are formed on the inter insulating layer 231. The source electrode 236 is connected to the source area S2 through the source contact hole 234 and the auxiliary capacitor electrode 230 is connected to the second capacitor electrode 225 through the first contact hole 227. The semiconductor 212, the drain electrode 214, the gate electrode 222, and the source electrode 236 form a thin film transistor T.

A passivation layer 237 is formed on an entire surface of the substrate 200 including the thin film transistor T. The passivation layer 237 includes a second contact hole 233 exposing a portion of the auxiliary capacitor electrode 230.

A second common line 238 and a common electrode 240 are formed on the passivation layer 237. The second common line 238 is connected to the auxiliary capacitor electrode 230 through the second contact hole 233, and the common electrode 240 is alternatively arranged with the pixel electrode 218. The second common line 238 and the common electrode 240 may be formed of the same material during the same process and may be one united body as shown in FIG. 8. The second common line 238 and the common electrode 240 may be formed of a transparent conductive material such as indium tin oxide (ITO) and indium zinc oxide (IZO).

The first capacitor electrode 216, the second capacitor electrode 225, the auxiliary capacitor electrode 230 and the second common line 238 form a storage capacitor $C_{ST}$ having an insulating layer (not shown) interposed therebetween.

Figure 10:
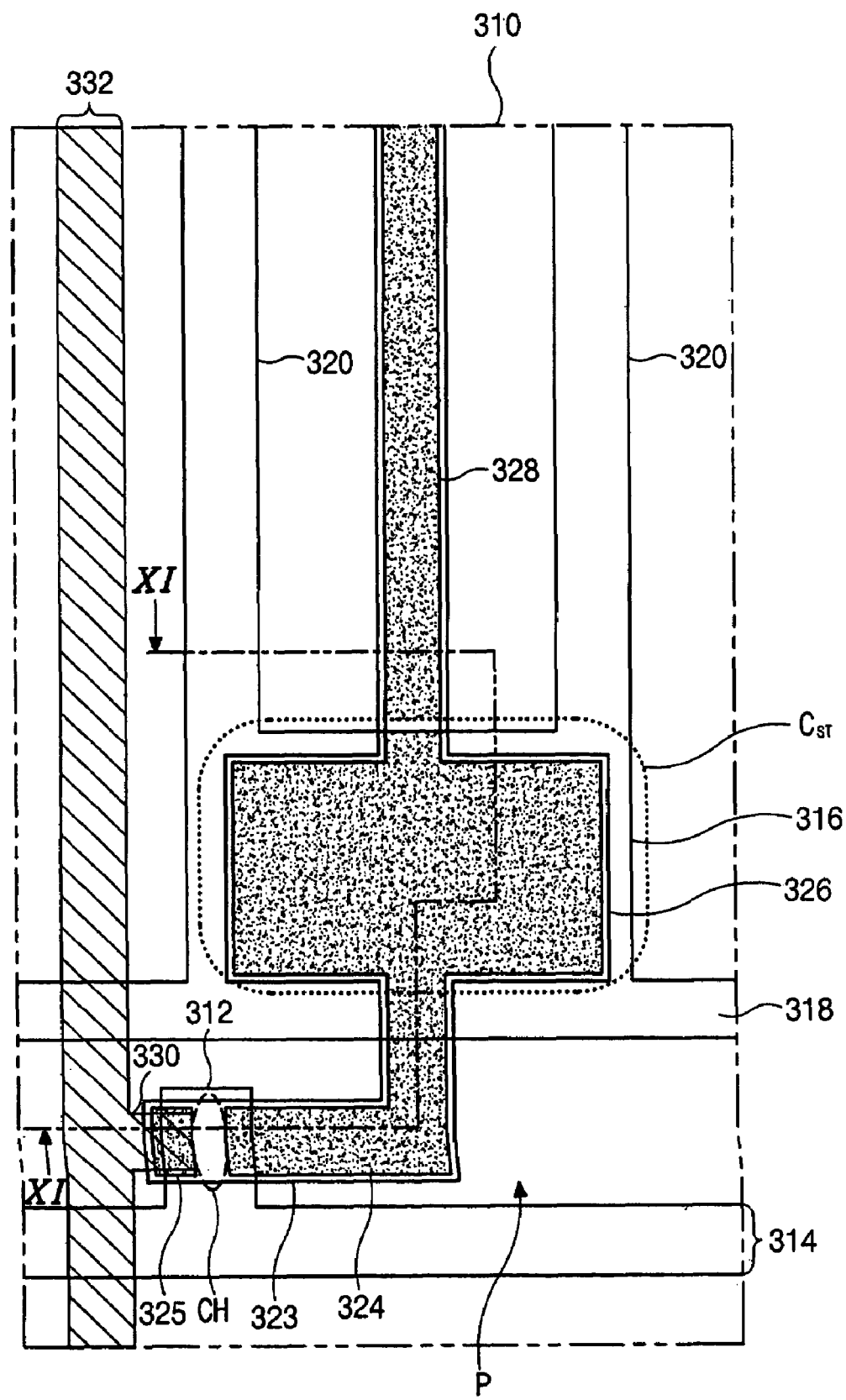
FIG. 10 is a plan view illustrating an array substrate for an IPS-LCD according to a third embodiment of the present invention.

FIG. 10 is a plan view illustrating an array substrate for an IPS-LCD according to a third embodiment of the present invention.

In FIG. 10, a gate line 314 including a gate electrode 312 is formed in a first direction, and a data line 332 including a source electrode 330 is formed in a second direction. The gate line 314 and the data line 332 cross each other to define a pixel region P. The gate electrode 312 extends from the gate line 314 in the second direction and the source electrode 330 extends from the data line 332 in the first direction. The source electrode 330 overlaps the gate electrode 312 by a distance. A common line 318 is formed substantially in parallel to the gate line 314. A first capacitor electrode 316 and a plurality of common electrodes 320 are formed in the pixel region P and are connected to the common line 318. The plurality of common electrodes 320 is substantially parallel to the data line 332. The common line 318, the first capacitor electrode 316 and the common electrodes 320 may be formed of the same material during the same process.

A drain electrode 324 is formed to overlap the gate electrode 312 and is spaced apart from the source electrode 330. A second capacitor electrode 326 and a pixel electrode 328 are formed in the pixel region P. The second capacitor electrode 326 overlaps the first capacitor electrode 316. The pixel electrode 328 is connected to the second capacitor electrode 326 and is substantially parallel to the data line 332. The pixel electrode 328 is alternatively arranged with the common electrode 320. The drain electrode 324, the second capacitor electrode 326 and the pixel electrode 328 may be formed as one unit. An ohmic contact layer 325 is formed of the same material during the same process as the drain electrode 324, and overlaps the source electrode 330. An active layer 323 is formed to correspond to the ohmic contact layer 325, the drain electrode 324, the second capacitor electrode 326 and the pixel electrode 328. The active layer 323 may formed of pure amorphous silicon, and the ohmic contact layer 325, the drain electrode 324, the second capacitor electrode 326 and the pixel electrode 328 may be formed of doped amorphous silicon.

An exposed portion of the active layer 323 between the source and drain electrodes 330 and 324 may be a channel CH of a thin film transistor, which is composed of the gate electrode 312, the source electrode 330, the drain electrode 324 and the active layer 323. The first and second capacitor electrodes 316 and 326 form a storage capacitor $C_{ST}$ having a gate insulating layer (not shown) interposed therebetween.

In a thin film transistor of the related art that includes amorphous silicon, the active layer of amorphous silicon and the ohmic contact layer of doped amorphous silicon are sequentially formed, and then the source and drain electrodes are formed of a metal material. However, in the present invention, the drain electrode 324, the second capacitor electrode 326 and the pixel electrode 328 are formed of the doped amorphous silicon. Therefore, in the present invention a process for forming a contact hole between the drain electrode and the pixel electrode may be omitted, and problems caused by the contact hole process may be reduced.

Also, because the doped amorphous silicon permits light-transmission similar to the doped polycrystalline silicon of the first and second embodiments and may be patterned by a dry etching method, the CD may be uniform over the whole panel and the aperture ratio may be increased.

Additionally, because the passivation layer may be omitted and the pixel electrode may be formed during the same process as the drain electrode, manufacturing costs may be reduced, and manufacturing productivity improved.

Figure 11:
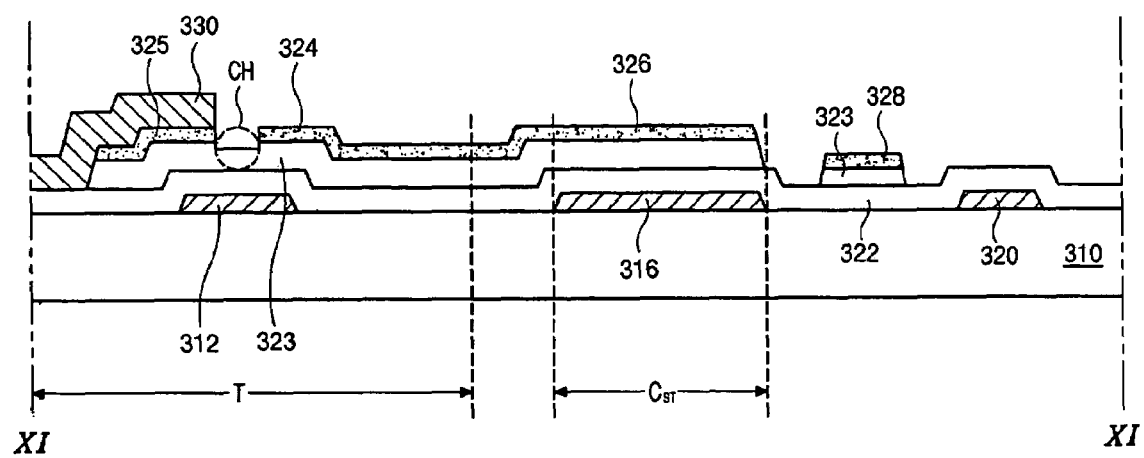
FIG. 11 is a cross-sectional view taken along the line XI-XI of FIG. 10.

FIG. 11 is a cross-sectional view illustrating the array substrate for the IPS-LCD device according to the third embodiment of the present invention, and corresponds to a cross-section taken along the line XI-XI of FIG. 10. In FIG. 11, a gate electrode 312, a first capacitor electrode 316, and a common electrode 320 are formed on a substrate 310. A gate insulating layer 322 is formed on an entire surface of the substrate 310 to cover the gate electrode 312, the first capacitor electrode 316 and the common electrode 320. An active layer 323 is formed on the gate insulating layer 322, and an ohmic contact layer 325, a drain electrode 324, a second capacitor electrode 326 and a pixel electrode 328 are formed on the active layer 323. The active layer 323 covers the gate electrode 312 and the first capacitor electrode 316, and is also disposed under the pixel electrode 328. The ohmic contact layer 325 and the drain electrode 324 are spaced apart from each other, and partially overlap the gate electrode 312. As stated above, the drain electrode 324, the second capacitor electrode 326 and the pixel electrode 328 may be formed as one unit. A source electrode 330 is formed to cover the ohmic contact layer 325.

The gate electrode 312, the source electrode 330, the drain electrode 324 and the active layer 323 form a thin film transistor T, and an exposed portion of the active layer 323 between the source and drain electrodes 330 and 324 becomes a channel CH of the thin film transistor T. The first and second capacitor electrodes 316 and 326, respectively, form a storage capacitor $C_{ST}$ having a gate insulating layer 322 interposed therebetween.

A liquid crystal display device having the array substrate of the present invention further includes an opposite substrate that faces the array substrate and a liquid crystal layer that is interposed between the array substrate and the opposite substrate.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching liquid crystal display device, comprising:
   a gate line on a substrate;
   a data line crossing the gate line to define a pixel region;
   a semiconductor layer including an active area and a source area, wherein the active area overlaps the gate line and the source area overlaps the data line;
   a drain electrode connected to the semiconductor layer;
   a first capacitor electrode in the pixel region and connected to the drain electrode;
   a pixel electrode connected to the first capacitor electrode and substantially in parallel to the data line;
   a common line substantially parallel to the gate line;
   a second capacitor electrode connected to the common line and overlapping the first capacitor electrode; and
   a common electrode connected to the common line and alternatively arranged with the pixel electrode, wherein the source area of the semiconductor layer, the drain electrode, the first capacitor electrode and the pixel electrode include doped polycrystalline silicon.

2. The array substrate of claim 1, wherein the semiconductor layer, the drain electrode, the first capacitor electrode and the pixel electrode are formed to be substantially integrated.

3. The array substrate of claim 1, further comprising a gate insulating layer under the gate line and the common line.

4. The array substrate of claim 3, wherein the first and second capacitor electrodes form a storage capacitor having the gate insulating layer interposed therebetween.

5. The array substrate of claim 1, further comprising an inter insulating layer covering a thin film transistor, the thin film transistor including the semiconductor layer, a gate electrode, a source electrode and the drain electrode.

6. The array substrate of claim 5, wherein the inter insulating layer includes a source contact hole to expose the source area of the semiconductor layer, and the source electrode being connected to the semiconductor layer via the source contact hole.

7. The array substrate of claim 1, wherein the semiconductor layer is patterned using dry etching.

* * * * *